Patented Apr. 2, 1946

2,397,498

UNITED STATES PATENT OFFICE 2,397,498

ESTERIFICATION OF SALICYLIC ACID

Robert L. May, Chicago, Ill., assignor to Sinclair Refining Company, New York, N. Y., a corporation of Maine No Drawing. Application April 24, 1943,
Serial No. 484,483

12 Claims. (Cl. 260—474)

This invention relates to the esterification of salicylic acid and, more particularly, to the esterification of salicylic acid with olefines. The invention has for its principal object the provision of an improved process for esterification of salicylic acid with olefines whereby the yield and quality of the esterified product are improved.

The esterification of organic acids with olefines has been known and carried out for many years. Likewise, the esterification of salicylic acid with olefines in the presence of boron trifluoride as a catalyst has been previously suggested. However, heretofore the esterification reaction has been largely dominated by competing side reactions. For example, it has been found that esterification of the salicylic acid is accompanied by rearrangement of the ester by migration of the alkyl radical to the ring of the salicylic acid. Further it has been found that esterification of the resulting alkylated salicylic acid produces an alkylated salicylic acid ester which, in turn, undergoes further rearrangement to form a more completely alkylated salicylic acid. The ultimate product of this reaction between salicylic acid and an olefine comprises a highly alkylated salicylic acid ester. Thus, whether the contemplated esterification is carried out only partially or to completion, the resulting product comprises a mixture of compounds of which the desired non-alkylated salicylic acid ester constitutes a relatively small proportion. Considering the aim of producing a non-alkylated salicylic acid ester, the production of alkylated products represents not only a problem of segregation of the desired product from the mixture but also represents a prohibitive consumption of salicylic acid in the production of unwanted compounds.

A further side reaction which usually takes place in the esterification of salicylic acid with olefines is a polymerization of the olefines themselves. Inasmuch as polymerization of the olefines is promoted by elevated temperatures, it has been considered necessary heretofore to carry out the esterification at low temperatures preferably not in excess of about room temperature. Polymerization of the olefine represents not only a loss of olefine which otherwise would be used for esterification of the salicylic acid but also is a source of another undesirable constituent, namely, polymers, in the esterification reaction product.

Calcium salts of alkyl esters of salicylic acid have been proposed and used extensively as particularly useful addition agents in petroleum lubricating oils. The alkyl esters of salicylic acid for use in the preparation of these calcium, and other metal, salts have been obtained largely by esterification of salicylic acid with alcohols. The high cost and frequent unavailability of many of the alcohols suitable for this esterification emphasizes the advantages of producing the alkyl esters of salicylic acid by esterification of the acid with olefines which are readily available and relatively inexpensive. However, the excessive alkylation of salicylic acid esterified with olefines in accordance with practices proposed and used heretofore has yielded products which, when converted to the appropriate calcium salt, are less desirable than the calcium salt of the non-alkylated salicylic acid ester, particularly when esterification of the salicylic acid is effected by means of refinery olefines.

I have now discovered that by appropriate control of certain reaction conditions the yield of alkyl esters of salicylic acid, and particularly the quality of the ester product obtained, may be increased and alkylation of the salicylic acid ring nucleus minimized when effecting this esterification with olefines. The resulting process is not only capable of yielding products less contaminated with alkylated compounds and polymers but makes possible a more economical consumption of salicylic acid whereby the advantages of esterification with olefines become real rather than theoretical.

In embodying this discovery in the esterification of salicylic acid with an olefine wherein salicylic acid is reacted with an olefine in the presence of boron trifluoride, the improved process of my invention comprises increasing esterification of the salicylic acid and minimizing alkylation of the acid by reacting the salicylic acid and the olefine at a temperature in excess of about 100° F. in the presence of about 0.05 to 0.5 mol of boron trifluoride for each mol of salicylic acid. In accordance with the invention, the reaction is advantageously carried out at temperatures in excess of about 150° F., and within the specified range of the proportion of catalyst to acid particularly effective results are obtained by using about 0.1 to 0.4 mol of boron trifluoride for each mol of salicylic acid.

As noted above, I have found that the yield and quality of the alkyl ester product of salicylic acid produced by esterification of the acid with an olefine in the presence of boron trifluoride is influenced to a marked degree by the ratio of the boron trifluoride catalyst used to the salicylic acid. Within the specified range of molar ratios from about 0.05 to 0.5 of the catalyst to 1 of the acid, the quality of the product generally increases with decreasing ratios of catalyst to acid.

The foregoing effect may be illustrated by comparing the saponification number of the product produced at different ratios of catalyst to acid. For example, the saponification value of pure octyl salicylate is 224. A saponification value of this order in the product obtained represents the ultimate in quality of the ester produced by reaction between octene-1 and salicylic acid inasmuch as both alkylated esters and olefine polymers lower this value when present in the product.

For the purpose of demonstrating the effect of catalyst to acid ratio on the quality of the product, tests were carried out in which a weighed amount of salicylic acid was suspended in a measured volume of solvent comprising a naphtha. Boron trifluoride gas was charged to the resulting mixture with constant agitation, and the increase in weight of the solution indicated the weight of boron trifluoride catalyst present. Octene-1 was then added very slowly over a period of about one hour and the reaction mixture was held at the desired reaction temperature for a period of several hours. At the end of this period the reaction mixture was washed with sodium carbonate in a percolator to remove the catalyst and any free acids, thereby forming a neutral product. The neutral product thus obtained was dried and the solvent was removed to a boiling point of 200° F. at 2.0 mm. The residue was analyzed and its saponification number ascertained. The sodium salts of the acids present were then acidified and the acids filtered and dried. The dried acidified filtrate was extracted with ether to insure complete recovery of the salicylic acid and this product was analyzed to determine its acid number. The acid number of pure salicylic acid is 406.

The saponification number of the neutralized product containing the octyl salicylate and obtained as described hereinabove ranged from about 193 to 203 in separate runs carried out over differing periods of time at 200° F. in the presence of about 0.15 to 0.18 mol of catalyst per mol of salicylic acid. Under similar reaction conditions, except for the catalyst-acid ratio, the saponification value of the neutralized product ranged from about 96 to about 136 when using a ratio of boron trifluoride to salicylic acid of about 0.43–0.44 to 1. Thus, the neutralized product obtained at the lower catalyst-acid ratio approached much more nearly the composition of octyl salicylate than did the neutralized product obtained at the higher catalyst-acid ratio. Moreover, the acid number of the acid extract obtained from the reaction using the lower catalyst-acid ratio ranged from 358 to 372, whereas the acid number of the acid extract obtained from the reaction using the higher catalyst-acid ratio ranged from 200–273. Thus, the unused salicylic acid component recovered from the reaction using the lower catalyst-acid ratio more nearly approached the acid number of pure salicylic acid than did the product recovered from the reactions using the higher catalyst-acid ratio. The salicylic acid component obtained from the former operation was thus less alkylated than the acid product obtained from the latter operation and was more adapted to be reused with additional olefine for further conversion to the salicylate.

The effect of decreasing catalyst-salicylic acid ratios is further illustrated by the results obtained by reacting octene-1 with salicylic acid at a temperature of 250° F. for a period of 6 hours. Under these reaction conditions, a boron trifluoride-salicylic acid ratio of 0.43:1 yielded a neutralized product having a saponification number of only 140.5 whereas the neutralized product obtained by using a boron trifluoride-salicylic acid ratio of 0.21:1 had a saponification number of 181. The same trend is observed in the esterification of salicylic acid with other olefines. For example, in the esterification of salicylic acid with refinery olefines having a boiling range between 212° F. and 257° F., obtained from a catalytic cracking unit and consisting predominantly of secondary and tertiary olefines, at a reaction temperature of 200° F. over a reaction period of about 5½–7 hours, the neutralized product obtained from reaction with a boron trifluoride-salicylic acid ratio of 0.5:1 had a saponification number of only 26.6 whereas the neutralized product obtained by reaction with a boron trifluoride-salicylic acid ratio of 0.37:1 had a saponification number of 42.8. In this as in similar comparisons, the acid number of the acid extract is higher and more nearly approaches that of pure salicylic acid when the esterification is carried out with the lower catalyst-acid ratio.

Accordingly, although esterification may be effected at boron trifluoride-salicylic acid ratios higher than 0.5:1, I have found that most effective results are obtained when catalyst-acid ratio does not exceed about 0.5 and preferably is in the lower portion of the useful range of about 0.05 to 0.5 mols of catalyst per mole of salicylic acid. In general, however, I prefer to use a catalyst-acid ratio between about 0.1:1 and 0.35:1, and particularly effective results are obtained with catalyst-acid ratios below about 0.2:1.

Although the quality of the salicylic acid ester product increases with decreasing ratios of boron trifluoride to salicylic acid, the yield of the ester decreases with these decreasing ratios of catalyst to acid. I have discovered, however, that with catalyst-acid ratios within the above-stated ranges, the yield of the ester is increased by increasing temperatures without sacrificing the quality of the ester product. Thus, although unsatisfactory results are obtained with temperatures below about 100° F. and satisfactory results are obtained with temperatures above about 100° F., still better yields are obtained when using reaction temperatures upward of about 150° F. For example, particularly satisfactory yields have been obtained with reaction temperatures of about 160° F. Still greater yields of the ester product of high quality have been obtained at reaction temperatures of about 200° F. to 250° F. Temperatures upwards of 250° F. may also be used with advantage.

As pointed out hereinabove, the quality of the salicylic acid ester product increases with decreasing catalyst-acid ratios, and the resulting use of decreasing amounts of catalyst tends to counteract the olefine-polymerizing effect of increasing temperatures. Accordingly, decreasing catalyst-acid ratios used with elevated temperatures which increase the yield of the salicylic acid ester provide for the production of an ester of high quality and good yield without objectionable increase in the extent of polymerization of the olefine used to effect this esterification.

In boron trifluoride-salicylic acid ratios within the aforementioned range, increasing time of contact or reaction between the salicylic acid and olefine increases the yield of the salicylic acid ester. Not only is the yield increased with increasing temperatures but also, particularly at relatively low catalyst-acid ratios, the saponification number of the ester product is increased. Thus, relatively low ratios of catalyst to salicylic acid preferentially favor esterification of the acid, rather than alkylation of the acid, to such an extent as to make possible greater esterification of the acid with increasing reaction periods. Reaction periods ranging from 1 to 20 hours have been used with good results and reaction periods of about 2 to 8 hours may be used with particular advantage.

I have further found it desirable that the molar ratio of olefine to salicylic acid exceed unity. An excess of the olefine drives the reaction to more complete utilization or esterification of the acid. Olefine-salicylic acid ratios of 1.5:1 to 10:1 and higher may be used with advantage. Particularly effective results are obtained using olefine salicyclic acid ratios from about 2:1 to 4:1.

The character of the olefine is also an important consideration not only with respect to yield but also with respect to the quality of the salicylic acid ester product. Primary olefines, illustrated for example by octene-1, give better yields and salicylic acid ester products of greater purity than do the secondary olefines and tertiary olefines. Tertiary olefines are still poorer than secondary olefines in these respects.

The terms "secondary olefines" and "tertiary olefines" are used herein, as conventionally, to designate olefines which react to give, respectively, secondary and tertiary derivatives, as for example alcohols on addition of water or chloro derivatives on addition of HCl, with the exception that octene-1, which is sometimes classified as a secondary olefine, is herein classified as a primary olefine, since in some of its reaction primary derivatives result. The term "primary olefines," as used herein includes ethylene and mono-substituted ethylene such as $RCH=CH_2$, where R is an alkyl group. An example of such mono-substituted ethylene is octene-1.

Under identical reaction conditions, for example, in which salicylic acid is esterified with octene-1 (a primary or normal olefine) and with 2-ethyl hexene-1 (a tertiary olefine), respectively, when these reaction conditions are such as to yield an ester product having a saponification number of 103 when using octene-1, the saponification number of the ester product is only 45.5 when using the 2-ethyl hexene-1. This same relationship exists when mixtures of olefines such as refinery olefines are used. For example, under similar reaction conditions, where refinery olefines boiling between 212° F. and 257° F., obtained from a catalytic cracking operation and comprising secondary and tertiary olefines, are used for esterification with the production of an ester product having a saponification number of 36.7, the saponification number of the ester product obtained when using polymerized refinery olefines, consisting mainly of tertiary olefines, is only about 8.0–9.2.

In using refinery olefines for the esterification of salicylic acid in accordance with my invention, improved results are obtained by appropriate selection of such olefine mixtures containing less tertiary olefines than secondary and primary olefines. Further improved results are obtained when such refinery olefines are subjected to treatment adapted to remove a substantial portion of the tertiary olefines. This result may be accomplished by subjecting the refinery olefines to treatment with sulfuric acid of relatively high concentration. For example, I have found that when portions of the same mixture of refinery olefines obtained from a catalytic cracking plant and having a boiling range of 212–257° F. are treated with 60% sulfuric acid, 70% sulfuric acid and 80% sulfuric acid, respectively, at a temperature not exceeding about 40° F. for one hour, the resulting neutralized dried and distilled olefines treated with 60% and 70% sulfuric acid show no material improvement in yield or quality of the ester product obtained when they are reacted with salicylic acid than the original refinery olefine without this acid treatment. However, the refinery olefine treated with 80% sulfuric acid produces an ester product of markedly increased saponification number and gives an increased yield of the ester product. Treatment of refinery olefines with sulfuric acid having a concentration of about 80% and higher is thus a useful and important complement to my esterification process when using refinery olefines as the source of olefine for esterification of salicylic acid.

The esterification of salicylic acid in accordance with the invention is preferably carried out in the presence of an appropriate solvent for the salicylic acid. Excellent results have been obtained using various naphthas of somewhat different boiling ranges, and the boiling range of the solvent appears to have no appreciable effect upon the yield or quality of the ester product.

The desired salicylic acid esters present in the ester products produced in accordance with the invention may be recovered effectively with extraction solutions comprising alcoholic caustic solutions. Solutions comprising about 5% to 10% sodium hydroxide in methyl alcohol have been used with advantage. Such extraction may be effected by dissolving in naphtha the neutralized ester product obtained as described hereinabove and extracting the resulting solution with aliquot portions of the extraction solution. Each portion of the extract is then washed with naphtha, the extract is diluted with about two volumes of water and is neutralized with dilute hydrochloric acid. After removing any acids present with sodium bicarbonate, the ester is extracted with benzol and the benzol is subsequently distilled off, leaving the desired ester as the residue.

The unesterified salicylic acid separated from the esterification product may be recovered by treating the acid with a sodium carbonate solution and precipitating salicylic acid therefrom by acidification. The resulting salicylic acid is a wet product which is somewhat difficult to dry. This difficulty may be avoided by an alternative procedure for recovery of the non-esterified salicylic acid which is made possible by the low extent of alkylation of the salicylic acid in accordance with the process of the invention. Salicylic acid is only slightly soluble in saturated hydrocarbons whereas alkylated salicylic acids are more soluble in saturated hydrocarbons. Thus, in accordance with the present invention, the non-esterified salicylic acid, which is only slightly alkylated by virtue of the reaction conditions of the present invention, and present in the naphtha solvent, is separated by precipitation therefrom by cooling the solution of the salicylic acid in this saturated hydrocarbon solvent. The acid is recovered by filtration and may be reused for further esterification with the olefine without intermediate treatment.

The process of my invention is, therefore, characterized by esterification of salicylic acid with production of high yields of esterified salicylic acid of high degree of purity, that is, relatively free from esterified alkylated salicylic acid. Alkylation of the salicylic acid is reduced to a minimum in accordance with the invention and unconverted salicylic acid may be readily recovered for reuse in further esterification of the acid with an olefine. A complete process is thus provided for esterification of salicylic acid with olefines under conditions which make possible economical yields of salicylic acid esters of high degree of purity and which also make available the non-esterified and non-alkylated acid for further esterification.

I claim:

1. In the esterification of salicylic acid by reaction of salicylic acid, in the presence of boron trifluoride, with an olefinic material from the group consisting of octene-1 and mixtures of refinery olefines boiling within the range of from about 212–257° F., the improvement which comprises increasing esterification of the salicylic acid and minimizing alkylation of the acid by reacting the salicylic acid and the olefinic material at a temperature in excess of about 100° F. in the presence of about 0.05 to 0.5 mol of boron trifluoride for each mol of salicylic acid.

2. In the esterification of salicylic acid by reaction of salicylic acid, in the presence of boron trifluoride, with an olefinic material from the group consisting of octene-1 and mixtures of refinery olefines boiling within the range of from about 212–257° F., the improvement which comprises increasing esterification of the salicylic acid and minimizing alkylation of the acid by reacting the salicylic acid and the olefinic material at a temperature in excess of about 100° F. in the presence of about 0.1 to 0.35 mol of boron trifluoride for each mol of salicylic acid.

3. In the esterification of salicylic acid by reaction of salicylic acid, in the presence of boron trifluoride, with an olefinic material from the group consisting of octene-1 and mixtures of refinery olefines boiling within the range of from about 212–257° F., the improvement which comprises increasing esterification of the salicylic acid and minimizing alkylation of the acid by reacting the salicylic acid and the olefinic material at a temperature in excess of about 150° F. in the presence of about 0.1 to 0.35 mol of boron trifluoride for each mol of salicylic acid.

4. In the esterification of salicylic acid by reaction of salicylic acid, in the presence of boron trifluoride, with an olefinic material from the group consisting of octene-1 and mixtures of refinery olefines boiling within the range of from about 212–257° F., the improvement which comprises increasing esterification of the salicylic acid and minimizing alkylation of the acid by reacting the salicylic acid and the olefinic material at a temperature in excess of about 200° F. in the presence of not more than about 0.2 mol of boron trifluoride for each mol of salicylic acid.

5. In the esterification of salicylic acid by reaction of salicylic acid, in the presence of boron trifluoride, with an olefinic material from the group consisting of octene-1 and mixtures of refinery olefines boiling within the range of from about 212–257° F., the improvement which comprises increasing esterification of the salicylic acid and minimizing alkylation of the acid by reacting the salicylic acid and the olefinic material in a ratio of at least 1.5 mols of the olefinic material for each mol of salicylic acid at a temperature in excess of about 100° F. in the presence of about 0.05 to 0.5 mol of boron trifluoride for each mol of salicylic acid.

6. In the esterification of salicylic acid by reaction of salicylic acid, in the presence of boron trifluoride, with an olefinic material from the group consisting of octene-1 and mixtures of refinery olefines boiling within the range of from about 212–257° F., the improvement which comprises increasing esterification of the salicylic acid and minimizing alkylation of the acid by reacting the salicylic acid and the olefinic material in a ratio of about 2 to 4 mols of the olefinic material for each mol of salicylic acid at a temperature in excess of about 100° F. in the presence of about 0.05 to 0.5 mol of boron trifluoride for each mol of salicylic acid.

7. Process according to claim 1, in which the mixture of refinery olefines contains tertiary olefines in only minor proportion.

8. Process according to claim 2, in which the mixture of refinery olefines contains tertiary olefines in only minor proportion.

9. Process according to claim 3, in which the mitxure of refinery olefines contains tertiary olefines in only minor proportion.

10. Process according to claim 4, in which the mixture of refinery olefines contains tertiary olefines in only minor proportion.

11. Process according to claim 5, in which the mixture of refinery olefines contains tertiary olefines in only minor proportion.

12. Process according to claim 6, in which the mixture of refinery olefines contains tertiary olefines in only minor proportion.

ROBERT L. MAY.